United States Patent
Babovic et al.

(10) Patent No.: US 12,459,814 B2
(45) Date of Patent: Nov. 4, 2025

(54) STEAM REFORMING

(71) Applicant: JOHNSON MATTHEY PUBLIC LIMITED COMPANY, London (GB)

(72) Inventors: Mileta Babovic, Billingham (GB); Mikael Carlsson, Billingham (GB); David Davis, Billingham (GB); Craig Foster, Billingham (GB); Graham Hinton, Billingham (GB); Andrew Edward Richardson, Billingham (GB); Craig Wilkinson, Billingham (GB)

(73) Assignee: Johnson Matthey Public Limited Company, London (GB)

( * ) Notice: Subject to any disclaimer, the term of this patent is extended or adjusted under 35 U.S.C. 154(b) by 329 days.

(21) Appl. No.: 18/002,930

(22) PCT Filed: Jul. 22, 2021

(86) PCT No.: PCT/GB2021/051893
§ 371 (c)(1),
(2) Date: Dec. 22, 2022

(87) PCT Pub. No.: WO2022/034285
PCT Pub. Date: Feb. 17, 2022

(65) Prior Publication Data
US 2023/0242398 A1  Aug. 3, 2023

(30) Foreign Application Priority Data
Aug. 13, 2020  (GB) .................. 2012616

(51) Int. Cl.
*C01B 3/40*  (2006.01)
*B01J 8/06*  (2006.01)
(Continued)

(52) U.S. Cl.
CPC ............. *C01B 3/40* (2013.01); *B01J 8/065* (2013.01); *B01J 8/067* (2013.01); *B01J 23/78* (2013.01);
(Continued)

(58) Field of Classification Search
None
See application file for complete search history.

(56) References Cited

U.S. PATENT DOCUMENTS 8,557,728 B2  10/2013  Birdsall et al.
8,563,460 B2  10/2013  Birdsall et al.
(Continued)

FOREIGN PATENT DOCUMENTS

| CN | 110013840 A | * 7/2019 | ......... B01J 37/0201 |
|---|---|---|---|
| GB | 1 031 751 A | 6/1966 | |

(Continued)

OTHER PUBLICATIONS

Borowiecki et al. "Studies of potassium-promoted nickel catalysts for methane steam reforming: Effect of surface potassium location" Applied Surface Science 300 (2014) 191-200 (Year: 2014).*

(Continued)

*Primary Examiner* — Jun Li
*Assistant Examiner* — Jialan Zhang
(74) *Attorney, Agent, or Firm* — BakerHostetler (57) ABSTRACT

A process is described for steam reforming a hydrocarbon feedstock, comprising passing a mixture of the hydrocarbon feedstock and steam through a catalyst bed comprising a particulate nickel steam reforming catalyst and a structured nickel steam reforming catalyst disposed within a plurality of externally heated tubes in a tubular steam reformer, wherein each tube has an inlet to which the mixture of hydrocarbon and steam is fed, an outlet from which a reformed gas containing hydrogen, carbon monoxide, car- (Continued)

bon dioxide, steam and methane is recovered, and the steam reforming catalyst at the outlet of the tubes is the structured steam reforming catalyst, wherein the particulate steam reforming catalyst comprises 5 to 30% by weight nickel, and the structured steam reforming catalyst comprises nickel dispersed over the surface of a porous metal oxide present as a coating on a non-porous metal or ceramic structure.

14 Claims, 3 Drawing Sheets

(51) Int. Cl.
  *B01J 23/78* (2006.01)
  *B01J 35/40* (2024.01)
  *B01J 35/55* (2024.01)
  *B01J 35/61* (2024.01)

(52) U.S. Cl.
  CPC .............. *B01J 35/40* (2024.01); *B01J 35/55* (2024.01); *B01J 35/615* (2024.01); *B01J 35/617* (2024.01); *B01J 35/618* (2024.01); B01J 2208/065 (2013.01); C01B 2203/0233 (2013.01); C01B 2203/0811 (2013.01); C01B 2203/0833 (2013.01); C01B 2203/1017 (2013.01); C01B 2203/1058 (2013.01); C01B 2203/1241 (2013.01); C01B 2203/141 (2013.01)

(56) References Cited

U.S. PATENT DOCUMENTS

| 9,975,767 B2 | 5/2018 | Farnell |
| 2004/0063797 A1 | 4/2004 | Aasberg-Petersen et al. |
| 2010/0068130 A1 | 3/2010 | Wilhelm |
| 2010/0196776 A1 | 8/2010 | Ahn et al. |
| 2012/0195801 A1 | 8/2012 | Whittenberger et al. |
| 2016/0347613 A1 | 12/2016 | Chlapik et al. |
| 2017/0183228 A1 | 6/2017 | Lin et al. |
| 2022/0212928 A1* | 7/2022 | Østberg ............... B01J 37/0215 |

FOREIGN PATENT DOCUMENTS

| JP | 2000-126595 A | 5/2000 |
| JP | 2012-501843 A | 1/2012 |
| JP | 2012-501844 A | 1/2012 |
| JP | 2017-508610 A | 3/2017 |
| WO | 00/26137 A1 | 5/2000 |
| WO | 2010/125369 A2 | 11/2010 |
| WO | 2015132555 A1 | 9/2015 |
| WO | WO-2018050291 A1 * | 3/2018 .............. B01J 19/32 |
| WO | WO-2021001189 A1 * | 1/2021 .............. B01J 19/30 |

OTHER PUBLICATIONS

Cao et al. "Numerical analysis on steam methane reforming in a plate microchannel reactor: Effect of washcoat properties", International Journal of Hydrogen Energy 41 (2016) 18921-18941 (Year: 2016).*

C Italiano et al, "Preparation of structured catalysts with Ni and Ni—RhCeO2 catalytic layers for syngas production by biogas reforming processes", Catalysis Today 273, 3-11, 2016.

Kee Young Koo et al., "Ni nanosheet-coated monolith catalyst with high performance for hydrogen production via natural gas steam reforming", Applied Catalysis A: General 525, 103-109, 2016.

Qi, "Design of Solid Catalysts", East China University of Science and Technology Press, pp. 85-86, 1994.

Stiles, "Catalyst Production—Laboratory and Industrial Preparation", East China University of Science and Technology Press, pp. 94-95, 1991.

Xiang, et al., "Solid catalysts", Chemical Industry Press, pp. 147-148, 1983.

* cited by examiner

STEAM REFORMING

This invention relates to a process of steam reforming hydrocarbons to produce a synthesis gas and to apparatus for carrying out the process.

Synthesis gas comprises hydrogen and carbon oxides (carbon monoxide and carbon dioxide) and may contain nitrogen and other gases such as argon and low levels of methane. The synthesis gas may contain greater or lesser amounts of hydrogen and carbon oxides suited to the particular end use, such as hydrogen manufacture for refineries or fuel cells, ammonia synthesis, methanol synthesis, dimethylether synthesis or the Fischer-Tropsch process for the synthesis of liquid hydrocarbons. Synthesis gas is often produced by a steam reforming process.

In a steam reforming process, a mixture of a hydrocarbon feedstock and steam, and in some cases also carbon dioxide, is passed at an elevated pressure through particulate catalyst-filled tubes, which are externally heated by means of a suitable heating medium, generally a hot gas mixture. The particulate catalyst is normally in the form of shaped units, e.g. cylinders having a plurality of through holes, and is typically formed from a refractory support material, such as alpha-alumina, calcium aluminate or magnesium aluminate, impregnated with a suitable catalytically active metal such as nickel.

WO2015132555 discloses an apparatus for steam reforming of hydrocarbons comprising a steam reformer containing a plurality of externally-heated vertical tubes each tube having an inlet for a feed gas mixture comprising hydrocarbon and steam, and an outlet for a reformed gas mixture, wherein the tubes contain a particulate steam reforming catalyst adjacent the outlet and a structured steam reforming catalyst adjacent the inlet. A process for steam reforming of hydrocarbons using said apparatus is also described.

We have found that, in contrast to the arrangement in WO2015132555, a combination of particulate catalyst adjacent the inlet and a structured catalyst adjacent the outlet can provide an optimal balance of pressure drop and resistance to carbon formation, which tends to occur near the inlet portion of the tubes in the tubular steam reformer. Moreover, the use of particulate catalysts in an arrangement where they are supported by the structured catalyst, removes the unwanted risk of gaps forming between the particulate catalysts and structured catalysts.

Accordingly the invention provides a process for steam reforming a hydrocarbon feedstock, comprising passing a mixture of the hydrocarbon feedstock and steam through a catalyst bed comprising a particulate nickel steam reforming catalyst and a structured nickel steam reforming catalyst disposed within a plurality of externally heated tubes in a tubular steam reformer, wherein each tube has an inlet to which the mixture of hydrocarbon and steam is fed, an outlet from which a reformed gas containing hydrogen, carbon monoxide, carbon dioxide, steam and methane is recovered, and the steam reforming catalyst at the outlet of the tubes is the structured steam reforming catalyst, wherein the particulate steam reforming catalyst comprises 5 to 30% by weight nickel, expressed as NiO, and has a largest dimension that is at most 15% of the internal diameter of the plurality of tubes, and the structured steam reforming catalyst comprises nickel dispersed over the surface of a porous metal oxide present as a coating on a non-porous metal or ceramic structure, wherein the nickel content of the metal oxide coating is in the range of 5 to 50% by weight and the thickness of the coating is in the range of 5 to 150 micrometres.

The hydrocarbon-containing feedstock fed to the process may comprise any gaseous or low boiling hydrocarbon feedstock, such as natural gas, associated gas, LPG, petroleum distillate, diesel, naphtha or mixtures thereof, or off-gases from chemical processes, such as a refinery off-gas or a pre-reformed gas. The hydrocarbon feedstock preferably comprises methane and may be a pre-reformed gas, an associated gas or natural gas. Natural gas is an especially preferred feedstock. The feedstock may be compressed to a pressure in the range 10 to 100 bar abs. The pressure of the hydrocarbon feedstock may usefully govern the pressure throughout the process. Operating pressure is preferably in the range 15 to 80 bar abs, more preferably 20 to 50 bar abs as this provides an enhanced performance from the process.

If the hydrocarbon feedstock contains sulphur compounds before or, preferably, after compression, the feedstock may be subjected to desulphurisation. Desulphurisation may comprise hydrodesulphurisation using CoMo or NiMo catalysts, and absorption of hydrogen sulphide using a suitable hydrogen sulphide absorbent, e.g. a zinc oxide adsorbent. An ultra-purification adsorbent may usefully be used downstream of the hydrogen sulphide adsorbent to further protect the steam reforming catalyst. Suitable, ultra-purification adsorbents may comprise copper-zinc oxide/alumina materials and copper-nickel-zinc oxide/alumina materials. To facilitate hydrodesulphurisation and/or reduce the risk of carbon laydown in the reforming process, hydrogen may be added to the compressed hydrocarbon feedstock. The amount of hydrogen in the resulting mixed gas stream may be in the range 1 to 20% vol, but is preferably in the range 1 to 10% vol, more preferably in the range 1 to 5% vol.

If the hydrocarbon feedstock contains other contaminants, such as chloride or heavy metal contaminants, these may be removed, prior to reforming, upstream or downstream of any desulphurisation, using conventional adsorbents. Adsorbents suitable for chloride removal are known and include alkalised alumina materials. Similarly, adsorbents for heavy metals such as mercury or arsenic are known and include copper sulphide materials.

Where the hydrocarbon-containing feedstock is a pre-reformed gas containing methane, this may be formed by subjecting a hydrocarbon/steam mixture to a step of adiabatic low temperature steam reforming. The hydrocarbon may be a rich natural gas, naphtha or other hydrocarbon-containing feedstock containing hydrocarbons heavier than methane. Pre-reforming processes are known. In such processes, the hydrocarbon/steam mixture is heated, typically to a temperature in the range 400 to 650° C., and then passed adiabatically through a fixed bed of a suitable particulate steam reforming catalyst, usually a precipitated catalyst having a high nickel content, for example above 40% by weight, expressed as NiO. During such an adiabatic low temperature reforming step, any hydrocarbons higher than methane react with steam to give a pre-reformed gas comprising a mixture of methane, carbon oxides and hydrogen. The use of an adiabatic reforming step, commonly termed pre-reforming, is desirable to ensure that the feed to the tubular steam reformer contains no hydrocarbons higher than methane and also contains a significant amount of hydrogen. This is desirable in order to minimise the risk of carbon formation on the catalyst in the downstream tubular steam reformer.

The feedstock may be pre-heated. It may conveniently be pre-heated after compression and before desulphurisation with a suitable heat source, such as a fired heater.

The hydrocarbon feedstock is mixed with steam to form a reforming feed gas. The steam introduction may be per-formed by direct injection of steam and/or by saturation of the feedstock by contact of the latter with a stream of heated water. In some embodiments, the hydrocarbon feedstock is saturated in a saturator fed with hot water to form a saturated gas mixture. The steam content of the saturated gas mixture may, if desired, be increased by the direct addition of steam. The water preferably comprises one or more of condensate streams recovered from the reformed gas, water recovered from the bottom of the saturator, and other condensate produced in the process. The amount of steam introduced is desirably sufficient to give a steam to carbon ratio of at least 1.8:1, i.e. at least 1.8 moles of steam per gram-atom of hydrocarbon carbon in the feedstock. It is preferred that the steam to carbon ratio is in the range 1.8:1 to 5:1, more preferably 2.5:1 to 3.5:1, especially 2.8:1 to 3.2:1 as this provides an optimal balance of hydrogen production and efficiency.

The reforming feed gas mixture is then desirably preheated prior to reforming. In a preferred embodiment, the hydrocarbon/steam mixture is heated by passing it through a fired heater. Desirably, the mixed stream is heated to an inlet temperature in the range 300 to 650° C. or 450 to 650° C., preferably 450 to 600° C., more preferably 450 to 550° C. Inlet temperatures in the range of 300 to 550° C. are particularly suitable when there is no pre-reformer and higher inlet temperatures in the range of 550 to 650° C. are particularly suitable when there is a pre-reformer.

During the reforming process, methane reacts with steam to produce hydrogen, carbon monoxide and carbon dioxide. Any hydrocarbons containing two or more carbon atoms that are present are converted to methane, which is steam reformed. In addition, the reversible water-gas shift reactions occur. Overall, the process is endothermic, requiring heating of the tubes and catalyst to maintain the reaction and achieve the desired conversion. The heat input to the steam reformer is typically such that the temperature of product gas stream at the outlet of the tubes is higher than the inlet temperature, often in the range of 100 to 350° C. higher than the inlet temperature.

The tubular steam reformer contains a plurality of tubes, usually arranged vertically, through which the gas mixture may be passed, and to which heat is transferred by means of a hot gas flowing around the exterior surfaces of the tubes. The hot gas may comprise a combustion gas or a synthesis gas. The tube inlets are typically at the top end such that the feed gas mixture is typically fed to the top of the steam reformer and flows downward through the tubes.

Thus the tubular steam reformer may have an inlet for the reforming feed gas, an outlet for a reformed gas mixture, and a plurality of vertical tubes in communication with the inlet through which the gas mixture may be passed, and to which heat is transferred by means of a hot gas flowing around the tubes in a heat exchange zone, wherein the tubes each contain steam reforming catalysts provided as layers within the tubes wherein at least the layer of steam reforming catalyst adjacent the outlet is the structured nickel steam reforming catalyst.

The catalyst adjacent the outlets of the tubes in the process is a structured steam reforming catalyst. By "structured steam reforming catalyst" we mean a steam reforming catalyst coating on a non-porous structure, typically a metal or ceramic structure. The nickel in the structured catalyst is dispersed over the surface of a porous metal oxide, which is supported as a surface coating on the non-porous structure.

The metal or ceramic structures are essentially non-porous and so have low surface areas essentially defined by their shape. To provide sufficient activity, the nickel in the structured catalyst is dispersed over a porous metal oxide coated the non-porous metal or ceramic support. The thickness of the porous metal oxide coating containing the nickel on the non-porous structure is in the range of 5 to 150 μm, preferably 10 to 100 μm, more preferably in the range 10 to 80 μm, most preferably in the range 10 to 50 μm. The preferred ranges provide an optimum of activity and adhesion and cohesion of the catalyst.

The nickel may be applied to the structure by known wash-coating methods, whereby a slurry of metal oxide, which may include nickel oxide as a component, is applied to the metal or ceramic structure, by dipping or spraying, and then dried and heat treated to bind the metal oxide to the support. Nickel may also be applied to a metal-oxide-coated support by impregnation techniques using a soluble nickel compound, then dried and calcined to convert the nickel compound to nickel oxide. Combinations of these techniques may be used, including applying nickel in solution in combination with a slurry of a metal oxide support The steam reforming catalyst on the structure comprises nickel. The nickel content of the metal oxide coating is in the range of 5 to 50% by weight, preferably 10 to 30% by weight, more preferably 10 to 20% by weight. Optionally, a platinum group metal selected from platinum, rhodium, ruthenium or palladium, or a mixture thereof may be included in the coating. If 10 included, platinum group metal promoters may be present in the coating in amounts in the range of 0.05 to 1% by weight. The coating may be applied to the non-porous support structure in an amount in the range of 10 to 150 g/m², preferably 10 to 80 g/m², more preferably 30 to 60 g/m².

The porous metal oxide over which the nickel is dispersed may be any suitable refractory oxide, comprising alumina, titania, zirconia, zinc oxide, magnesia, ceria, praseodymium oxide, yttria, and lanthana. Preferred porous metal oxides comprise alumina, zirconia, ceria, lanthana and mixtures of two or more thereof.

The structured catalyst may comprise metal or ceramic structures having a plurality of passages through which a process fluid may pass in ordered, non-random directions. This is in contrast to the particulate catalyst where the flow of process fluid is essentially non-ordered or random. Structured catalysts provide reduced pressure drop and improved heat transfer compared to particulate catalysts. The structured catalysts may suitably comprise cylindrical units with a diameter complimentary to the tubes in which they are placed, comprising a plurality of passages through which a process fluid may pass in ordered, non-random directions. By the term "complimentary", the diameter of the cylindrical units may be 1-20 mm less than the internal diameter of the tube in which they are placed so that they fit neatly within the tube. The cylindrical units may comprise perforations and/or internal structures that cause process fluid to flow both axially and radially as it passes through the units. The cylindrical units are preferably stackable such that they may be readily loaded upon each other and are self-supporting within the tubes. For coated cylindrical structures having a plurality of passages through which a process fluid may pass in ordered, non-random directions the amount of coating may be about 4 to 7 kg Ni as NiO per cubic meter of tube.

Structured catalysts prepared using commercially available stainless steel metal foils are preferred.

Preferred structured catalysts are described in US2012/0195801 A1. These structured catalysts comprise a fan in the form of a corrugated metal disk arranged on a central rod. The fan has radial fluid ducts formed from folded metal foils that radially guide the fluid flow to contact the inside wall of the tube; the fan having a top surface, a bottom surface and an outer diameter face such that the radial fluid ducts terminate along the outer diameter face of the fan to form fluid duct openings facing the inside wall of the tube, the fan further having a flat or corrugated metal washer in contact with the top surface or the bottom surface of the fan, where the washer may be in the shape of a ring having an inner diameter and an outer diameter, the washer being in contact with the top surface or the bottom surface of the fan so that the outer diameter of the washer extends radially outward from the outer diameter face of the fan. The washer may further have spacing tabs extending outward from the outer diameter of the washer that separate it from the inside wall of the tube such that the washer creates a gap between the outer diameter face of the fan and the reactor tube.

In the present invention, the tubes comprise a non-structured, particulate steam reforming catalyst directly upstream of the structured catalyst. The relative amounts of the steam reforming catalysts may vary in thickness to produce the desired conversion. The structured catalyst layer may comprise 95% to 5% of the volume of the bed or may comprise 80% to 20% of the volume of the bed or may comprise 75% to 25% of the volume of the bed or may comprise 70% to 50% of the volume of the bed. The different arrangements offer different advantages. The arrangement where the structured catalyst is in the range 70-50% of the volume of the bed offers an optimal range of activity and pressure drop as well as controlling carbon deposition.

The particulate steam reforming catalyst may be a conventional particulate steam reforming catalyst in which the nickel is distributed throughout the particle or an eggshell nickel catalyst in which a nickel layer is present only at the surface of the particle. Suitable eggshell nickel steam reforming catalysts re described in WO2010/125369 A1.

Suitable particulate catalysts comprising nickel, and optionally potassium oxide, supported on a refractory oxide support comprising alumina or alkaline earth metal aluminate, such as calcium aluminate and/or magnesium aluminate. Such particulate catalysts are commercially available.

The particulate catalysts have nickel contents, expressed as NiO, in the range 5 to 30% by weight, preferably 10% to 30% by weight.

Including an alkali metal oxide such as potassium oxide, in the particulate catalyst is particularly preferred to reduce carbon formation. The alkali metal oxide, such as potassium oxide, may be present in an amount in the range of 0.5 to 7.0% by weight on the particulate catalyst.

The particle size of the particulate catalyst may vary depending on the dimensions of the tube. The particulate catalysts are loaded as a random packed bed, which means they may lie at any orientation within the plurality of tubes. The particulate catalysts in the present combination may be physically smaller than normally used because the increased pressure drop this causes will be offset by the low pressure drop structured catalyst downstream of the particulate catalyst. Smaller particles are useful because they can provide a higher geometric surface area and hence activity per $m^3$ than larger particles.

The particulate catalyst particles have a largest dimension that is at most 15% of the internal diameter of the plurality of tubes in which they are placed. By "largest dimension" we mean the largest width or diameter, length, breadth or height of the particle. The largest dimension of the particles of particulate catalyst may be suitably in the range of 3 to 15% of the internal diameter of the plurality of tubes. Below about 3% the pressure drop may be unacceptably high, whereas above 15% the performance of the catalyst may be reduced.

The particulate catalyst may be in the form of spheres, spheroids or cylinders, including lobed or fluted shapes. The particulate catalysts may be formed by pelleting or extrusion or by other shaping methods, including additive-layer manufacturing or 3D-printing. The particulate steam reforming catalyst is suitably a pelleted catalyst as the balance of physical properties of pelleted catalysts is generally superior to that obtained by other shaping methods.

The particulate catalyst particle may be cylindrical and may be lobed or fluted and contain one or more through holes to enhance geometric surface area and reduce pressure drop.

The particulate catalyst is preferably cylindrical with a diameter in the range 3 to 10 mm or 5 to 25 mm and a length in the range 2 to 15 mm or 5 to 25 mm. The aspect ratio, i.e. the diameter/length may be in the range of 1:0.5 to 2:1. The ends of the cylinder may be flat or domed.

The particulate steam reforming catalyst may comprise 3 to 10 through holes and optionally 3 to 12 flutes or lobes around the periphery of the pellet. The through holes and lobes or flutes advantageously increase geometric surface area and reduce pressure drop through the particulate catalyst.

For cylindrical catalyst particles with an aspect ratio in the range of 0.75 to 1.0, the ratio of the ratio of the internal diameter of the tube to the diameter of the catalyst particle (Dt/dp) is preferably in the range 5:1 to 50:1, preferably 8:1 to 50:1.

Examples of suitable particulate catalysts include 3.3 mm diameter×3.4 mm height cylinders, 8 mm breadth×7 mm height 4-hole cloverleaf shapes, and 10 mm diameter×13 mm height 4-hole, 4-fluted cylinders. The latter are available as QUADRALOBE™ catalysts from Johnson Matthey PLC.

The size of the particulate catalyst may also be expressed in terms of the equivalent spherical diameter (or ESD). The ESD of an irregularly shaped object may be expressed as the diameter of a sphere of equivalent volume (ESDv). The ESDv of the particulate catalyst may be in the range 3 to 15 mm. Alternatively, the ESD of an irregularly shaped object may be expressed as a sphere of the same specific surface area, i.e. the same surface area to volume ratio, (ESDa). This approach may be more appropriate for complex shapes where geometric surface area of the catalyst particles is the main parameter. The ESDa of the particulate catalyst may be in the range 3 to 5 mm.

The particulate catalyst may possess an external geometric surface area ranging from 200 to 2000 $m^2/m^3$ or 500 to 2000 $m^2/m^3$. This may be obtained by, for example, using 3 to 4.5 mm diameter cylinders with heights varying from 2 to 6 mm, 5 to 9 mm diameter 3 to 7-hole cylinders with heights varying from 3 to 6 mm and hole diameters from 1 to 2 mm. Other variations can readily be achieved from common catalyst shapes.

In the process, the catalyst bed may consist of two or three or more layers of steam reforming catalyst wherein in each case the layer of steam reforming catalyst adjacent the outlets of the tubes is the structured catalyst.

The catalyst tubes may comprise or consist of two layers of nickel steam reforming catalyst wherein the catalyst layer adjacent the outlets of the tubes is the structured nickel steam reforming catalyst and the catalyst layer adjacent the inlets of the tubes is a particulate nickel steam reforming catalyst.

There are a variety of benefits to using the combination of catalysts to increase tolerance of the reformer to carbon formation and increased reformer performance at no expense of pressure drop. By utilising particulate catalysts, specifically small particles, in the 'inlet' region of the reformer at cooler temperatures it is possible to maximise activity. Simultaneously utilising structured catalyst at the hotter outlet region of the reformer it is possible to minimise overall pressure drop of the catalyst charge.

In some embodiments, the catalyst tubes may consist of three layers of nickel steam reforming catalyst; a structured catalyst layer at the inlets of the tubes, a particulate catalyst layer at a middle or second region of the tubes, and a structured catalyst layer at the outlets of the tubes. This can allow for simultaneous high activity at low temperature, increased overall heat transfer, with the particulate catalyst provided in the tubes at points where the risk of carbon formation is highest. In this arrangement, the particulate catalyst may be contained within a gas permeable container or containers located between the structured catalyst layers.

The catalyst is typically provided to the tubes of the tubular steam reformer in an oxidic form and activated by reduction of the nickel oxide, to form elemental nickel, in-situ. For example, the catalyst in oxidic form may be placed in the tubes, and the nickel oxide reduced with a reducing agent, such as a hydrogen-containing gas. Known reduction techniques may be used to generate the active catalyst for steam reforming.

Alternatively, nickel oxide in the catalyst may be reduced ex-situ and then the elemental metal coated with a thin passivating layer of oxide using an oxygen containing gas, such as air or nitrogen-diluted air. A mixture of oxygen and carbon dioxide, optionally with nitrogen, may also be used. In this way the reduced catalyst may be transported safely to the user, and the time to generate the active catalyst and quantity of hydrogen used during the subsequent activation, reduced.

Various tubular steam reformer arrangements may be used. The tubular steam reformer may be a conventional top-fired steam reformer or a side-fired steam reformer. In such reformers the hot gas is provided by combusting a fuel gas using a plurality of burners disposed either at the top end or along the length of the tubes. Alternatively, the steam reformer may be a gas-heated reformer (GHR) in which the hot gas may be provided by a flue-gas from a combustion process, or may be a synthesis gas generated by catalytic or non-catalytic partial oxidation of a hydrocarbon, or by autothermal reforming of a hydrocarbon and/or the reformed gas mixture. Furthermore, the hot gas may be mixed with the reformed gas that has passed through the plurality of tubes.

The plurality of tubes in the tubular steam reformer may have a circular cross section and may have a length of 5 to 15 m and an internal diameter in the range 5 to 30 cm or 5 to 15 cm. The internal diameters of each of the of tubes is preferably about the same.

In use, the tubes operate with a temperature gradient along their length with the inlet end of the tubes cooled by the endothermic steam reforming reactions. The temperature of the tubes and the reacting gas at the inlets may be in the range 300 to 650° C. or 450 to 650° C., preferably 450 to 600° C., more preferably 450 to 550° C. At the outlet end of the tubes where the conversion to form the synthesis gas is essentially complete, the tubes are hotter. The temperature of the tubes and the reacting gas at the outlets may be in the range 600 to 950° C. It is possible to express the temperature of the catalyst in the tube as a bed temperature, which is an average temperature of the catalyst between the inlet and the outlet of the catalyst bed within the tube or tubes. The bed temperature may desirably be in a range of from 625 to 775° C. or from 640 to 760° C.

The reformed gas, or crude synthesis gas, is recovered from the outlets of the tubes. The reformed gas contains hydrogen, carbon monoxide, carbon dioxide, steam, ammonia and methane. The reformed gas contains some methane due to the equilibrium limitations of the process. The methane content or "methane slip" from a tubular reformer is an indication of the process efficiency. Furthermore, methane can build up in downstream processes using the reformed gas, which is undesirable and accordingly a low methane slip is desired. Using the structured steam reforming catalyst and the reaction conditions, the process is able to provide a low methane slip, e.g. below 15% by volume on a dry gas basis. The methane slip is preferably less than 10% by volume on a dry gas basis and especially less than 5% by volume on a dry gas basis where the crude synthesis gas is not subsequently subjected secondary or autothermal reforming. The term, "on a dry gas basis" discounts the steam content of the reformed gas and is used to allow comparison with other reformed gases having different amounts of steam.

Utilising a particulate catalyst in the cool region of the reformer allows increased activities over utilising a structured catalyst only, while maintaining some of the benefit of the structured catalyst, such as reduced pressure drop. Moreover, using alkalised (e.g. potassium oxide containing) particulate catalysts, means that additional carbon protection can be afforded to the structured catalyst arrangement. Utilising particulate catalysts for this rather than formulating potassium into the structured catalyst coating allows for a larger reservoir of potassium in the reformer than would be possible by adding potassium to the coating on the structured catalyst alone.

It is further possible to utilise a particulate catalyst between structured catalysts in a specific part of the tube where the conditions would otherwise favour carbon formation. This arrangement optimises the performance of the structured catalyst and the benefits that it brings (increased heat transfer, reduced pressure drop, closer approach to equilibrium, and higher hydrogen production) in steam reforming applications where it may not otherwise be possible due to the risk of carbon forming.

Accordingly, the invention further provides the use, as described herein, of a combination of a non-structured, particulate steam reforming catalyst comprising 5 to 30% by weight nickel, expressed as NiO, having a largest dimension that is at most 15% of the diameter of the plurality of tubes, and a structured steam reforming catalyst comprising nickel dispersed over the surface of a porous metal oxide, present as a coating on a non-porous metal or ceramic structure, wherein the nickel content of the metal oxide coating is in the range of 5 to 50% by weight and the thickness of the coating is in the range of 5 to 150 micrometres for suppression of carbon formation on the catalyst during catalytic steam reforming of a hydrocarbon feedstock.

The process of the present invention may be used as part of a process for the manufacture of hydrogen, methanol, dimethyl ether, olefins, ammonia, urea or hydrocarbon liquids, e.g. diesel fuels, obtained by the Fischer-Tropsch synthesis. Thus, the reformed gas may be subjected to further processing including one or more steps of cooling to below the dew point of the steam, separation of condensate, hydrogen separation, carbon dioxide separation, methanol synthesis, dimethyl ether synthesis, olefin synthesis, ammonia synthesis, or hydrocarbon liquid synthesis. Known processes may be used to accomplish these steps.

The invention is further described by reference to the following Examples and FIGS. 1 to 3, in which.

EXAMPLES

Steam reformer modelling software was used to examine the difference between various catalyst configurations in order to quantify benefits of using commercially available pelleted steam reforming catalyst over CATACEL SSR™ structured steam reforming catalysts in a steam reformer comprising a plurality of tubes each having an internal diameter of 127 mm. The properties of the particulate catalysts were as follows:

| Catalyst | Nickel content (NiO % wt) | Potash content ($K_2O$ % wt) | Shape |
|---|---|---|---|
| KATALCO ™ 57-4Q | 16 | 0 | 4-fluted, 4-hole cylinder Diameter 13 mm Length 17 mm |
| KATALCO ™ 25-4MQ | 18 | 1.8 | 4-fluted, 4-hole cylinder Diameter 10.5 mm Length 13 mm |

The following arrangements were modelled:

| Example | Catalyst arrangement by volume (inlet to outlet) |
|---|---|
| Comparative Example 1 | 100% KATALCO 57-4Q |
| Comparative Example 2 | 40%/60% KATALCO 25-4MQ/KATALCO 57-4Q |
| Comparative Example 3 | 100% CATACEL SSR |
| Example 4 | 40%/60% KATALCO 25-4MQ/CATACEL SSR |

The model was run with fixed methane slip and fixed exit pressure in each case under operating conditions where carbon formation is possible.

Key performance indicators used in this assessment are shown in the Table below. The R-factor represents a ratio between carbon gasification rate and carbon formation rate. A R-factor greater than 1.0 indicates a tendency for carbon formation in the reformer. The tube wall temperature margin is a difference between a design tube temperature and the operating temperature and indicates potential for tube failure if this margin is less than 25° C. Pressure drop indicates the resistance to flow though the tubes in the reformer.

| Catalyst arrangement (inlet to outlet) | Pressure drop (dP), bar | R-factor | Relative minimum tube wall temperature margin (To Comparative Example 1) |
|---|---|---|---|
| Comparative Example 1 | 1.6 | 1.223 | 1.000 |
| Comparative Example 2 | 2.0 | 0.607 | 1.077 |
| Comparative Example 3 | 1.1 | 0.739 | 2.000 |
| Example 4 | 1.8 | 0.598 | 1.846 |

Comparative Example 1 represents a conventional pelleted catalyst use. The pressure drop for the larger pellets is modest, but the R-factor indicates that under the reaction conditions carbon formation is likely.

Comparative Example 2 replaces a portion of the pelleted catalyst with a smaller potassium-doped pelleted catalyst. The R-factor is lower and the tube wall temperature margin is larger, but the pressure drop is much higher.

Comparative Example 3 uses only the structured catalyst. The pressure drop is very low and the minimum tube wall temperature margin is higher, but the R-factor is increased over Comparative Example 2.

Example 4, which uses a small pellet with a largest dimension about 10% of the internal diameter of the plurality of tubes upstream of the structured catalyst, indicates that under the same conditions, the carbon formation is reduced to below that of Comparative Example 2 but that the pressure drop is improved. Versus Comparative Example 3 the R-factor is also lower, indicating a reduced tendency for carbon formation in the reformer from the claimed combination and the tube wall temperature margin is relatively high.

Figure 1:
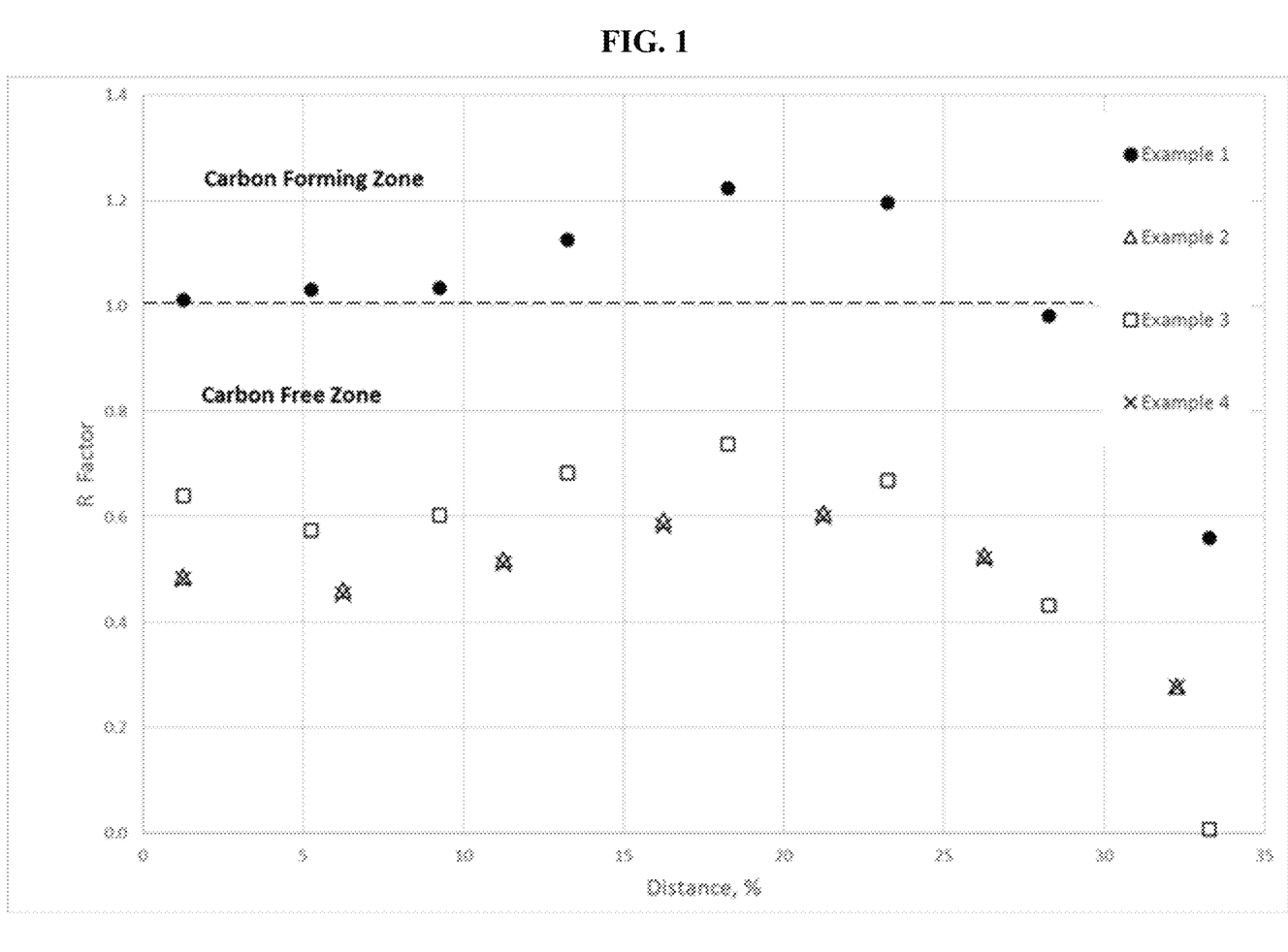
FIG. 1 is a comparison of the R-Factor over tube length for different catalyst arrangements.
Figure 2:
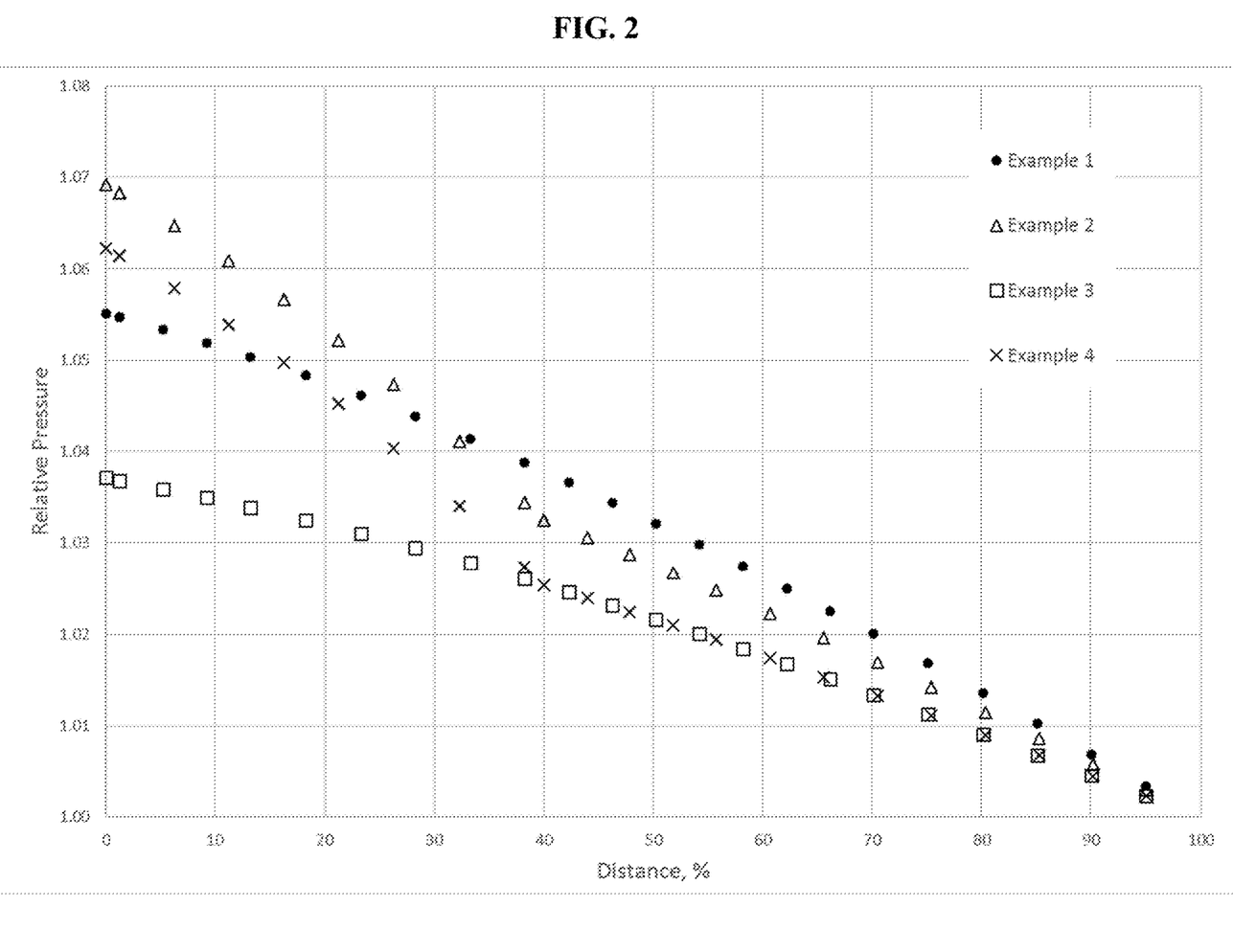
FIG. 2 is a comparison of pressure drop over tube length for different catalyst arrangements.
Figure 3:
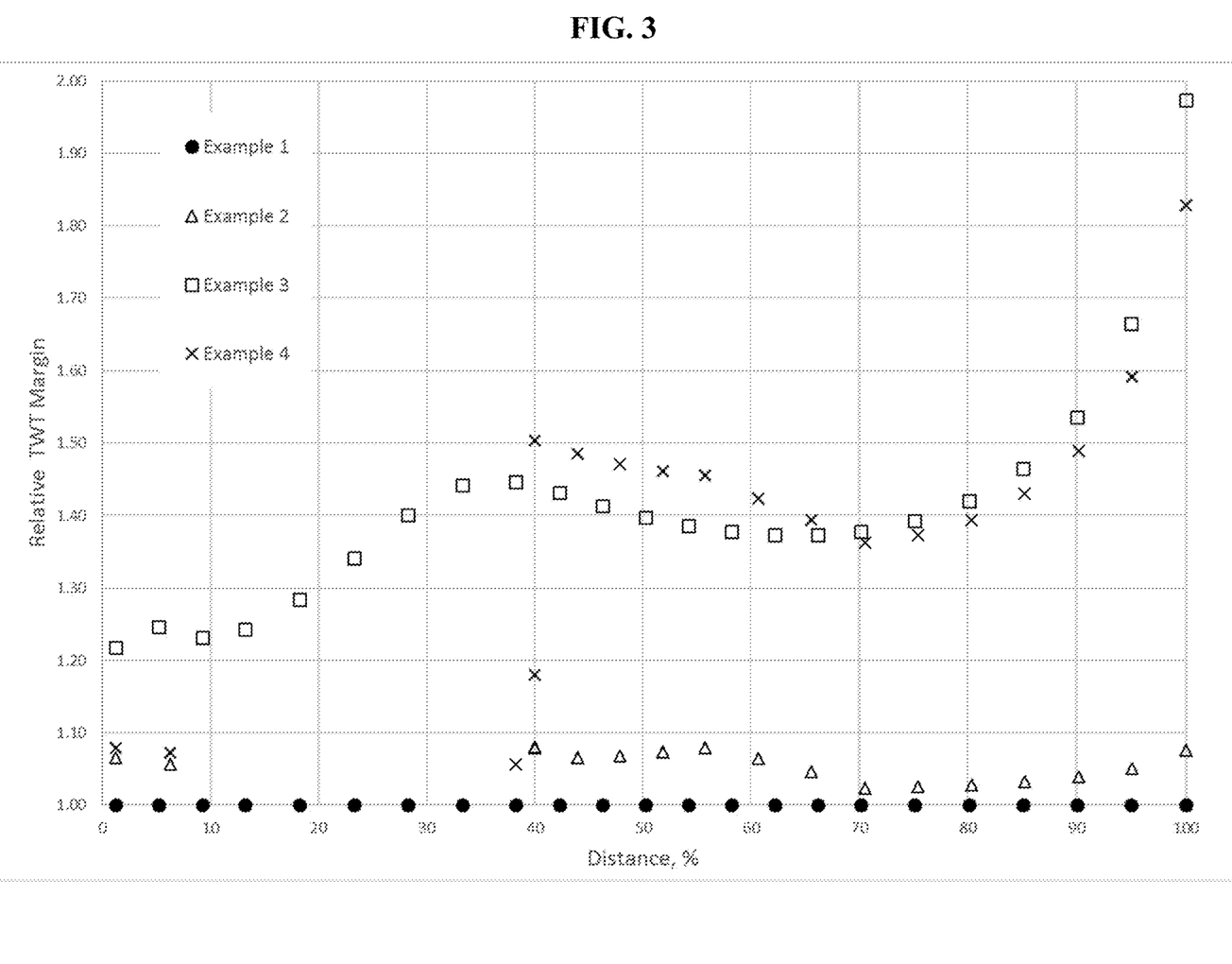
FIG. 3 is a comparison of relative tube wall temperature margin over tube length for different catalyst arrangements.

A comparison of R-factor, pressure drop and minimum tube wall temperature margin is depicted FIGS. 1-3. These illustrate that the use of hybrid configuration of particulate catalysts with the structured catalyst offers an optimal solution in terms of reliable plant operation and increased plant efficiency because:

(i) An increased carbon margin enables operation at lower steam to carbon ratios, which means improved reliability and reduced sensitivity to steam flow fluctuations. It also improves feedstock flexibility whereby gas with increased content of higher hydrocarbons can be processed;

(ii) Lower tube wall temperatures (TWTs) enable safer, more reliable and more efficient furnace operation, by reducing likelihood of tube failure and reduced fuel usage; and (iii) Reduced pressure drop reduces demand on compression power and allows increase in plant throughput for the same pressure drop, without additional power demand.

The invention claimed is:

1. A process for steam reforming a hydrocarbon feedstock, comprising passing a mixture of the hydrocarbon feedstock and steam through a catalyst bed comprising a particulate steam reforming catalyst and a structured steam reforming catalyst disposed within a plurality of externally heated tubes in a tubular steam reformer, wherein each tube has an inlet to which the mixture of the hydrocarbon feedstock and the steam is fed, an outlet from which a reformed gas containing hydrogen, carbon monoxide, carbon dioxide, steam and methane is recovered, and the steam reforming catalyst at the outlet of the tubes is the structured steam reforming catalyst, wherein the particulate steam reforming catalyst comprises 5 to 30% by weight nickel, expressed as NiO, and has a largest dimension that is at most 15% of the internal diameter of the plurality of tubes, and the structured steam reforming catalyst comprises nickel dispersed over the surface of a porous metal oxide present as a coating on a non-porous metal or ceramic structure, wherein the nickel content of the coating of the porous metal oxide, as expressed as NiO, is in the range of 5 to 50% by weight and the thickness of the coating of the porous metal oxide is in the range of 5 to 150 micrometres, wherein the plurality of the externally heated tubes consists of three layers of nickel steam reforming catalyst: a structured steam reforming catalyst layer at inlets of the plurality of the externally heated tubes, another structured steam reforming catalyst layer at outlets of the plurality of the externally heated tubes, and a particulate steam reforming catalyst layer located in between these two structured stream reforming catalyst layers, and a structured steam reforming catalyst layer at outlets of the plurality of the externally heated tubes.

2. The process according to claim 1 wherein the hydrocarbon feedstock comprises methane, a pre-reformed gas, an associated gas or natural gas.

3. The process according to claim 1, wherein the tubular steam reformer contains the plurality of the externally heated tubes through which the mixture of the hydrocarbon feedstock and steam is passed, and to which heat is transferred by means of a hot gas comprising a combustion gas or a synthesis gas, flowing around the plurality of the externally heated tubes.

4. The process according to claim 1, wherein the structured steam reforming catalyst comprises metal or ceramic structures having a plurality of passages through which a process fluid may pass in ordered, non-random directions.

5. The process according to claim 1, wherein the structured steam reforming catalyst comprises cylindrical units with a diameter complimentary to the plurality of the externally heated tubes in which they are placed, comprising a plurality of passages through which a process fluid may pass in ordered, non-random directions.

6. The process according to claim 1, wherein the particulate steam reforming catalyst comprises an alkali metal oxide, in an amount in the range of 0.5 to 7.0% by weight on the particulate steam reforming catalyst.

7. The process according to claim 1, wherein the largest dimension of the particulate steam reforming catalyst is in the range of 3 to 15% of the internal diameter of the plurality of the externally heated tubes in which it is placed.

8. The process according to claim 1, wherein the particulate steam reforming catalyst is a pelleted steam reforming catalyst.

9. The process according to claim 1, wherein the particulate steam reforming catalyst is cylindrical with a diameter in the range 3 to 10 mm or 5 to 25 mm and a length in the range 2 to 15 mm or 5 to 25 mm and an aspect ratio in the range of 1:0.5 to 2:1.

10. The process according to claim 1, wherein the particulate steam reforming catalyst comprises 3 to 10 through holes and optionally 3 to 12 flutes or lobes around the periphery of the pellet.

11. The process according to claim 9, wherein the particulate steam reforming catalyst is cylindrical with an aspect ratio in the range of 0.75 to 1.0 and the ratio of the internal diameter of the plurality of the externally heated tubes to the diameter of the particulate steam reforming catalyst (Dt/dp) is in the range 5:1 to 50:1.

12. The process according to claim 1, wherein the particulate steam reforming catalyst has an equivalent spherical diameter, expressed as a sphere of the same specific surface area, in the range of 3 to 5 mm.

13. The process according to claim 1, wherein the particulate steam reforming catalyst has an external geometric surface area in the range of 200 to 2000 $m^2/m^3$.

14. The process according to claim 1, wherein the particulate catalyst is contained within a gas permeable container or containers located between the structured steam reforming catalyst layers.

* * * * *